United States Patent
Domergue et al.

(10) Patent No.: US 6,221,475 B1
(45) Date of Patent: Apr. 24, 2001

(54) FRICTION ELEMENT IN COMPOSITE CARBON/CARBON-SILICON CARBIDE MATERIAL AND METHOD FOR MANUFACTURING SAME

(75) Inventors: Jean-Marc Domergue, Pessac; Jean-Michel Georges, Blanquefort; Michel Laxague, Bordeaux, all of (FR)

(73) Assignee: Societe Nationale d'Etude et de Construction de Moteurs d'Aviation - S.N.E.C.M.A., Paris (FR)

( * ) Notice: Subject to any disclaimer, the term of this patent is extended or adjusted under 35 U.S.C. 154(b) by 0 days.

(21) Appl. No.: 09/284,402
(22) PCT Filed: Oct. 14, 1997
(86) PCT No.: PCT/FR97/01831
  § 371 Date: Apr. 13, 1999
  § 102(e) Date: Apr. 13, 1999
(87) PCT Pub. No.: WO98/16484
  PCT Pub. Date: Apr. 23, 1998

(30) Foreign Application Priority Data

Oct. 14, 1996 (EP) .................................................. 96402184

(51) Int. Cl.[7] .................................................... D04H 13/00
(52) U.S. Cl. ...................... 428/292.1; 523/149; 523/150; 523/152; 523/153; 523/155; 523/156; 523/157; 523/158

(58) Field of Search ......................... 428/292.1; 523/149, 523/150, 152, 153, 155, 156, 157, 158

(56) References Cited

U.S. PATENT DOCUMENTS 3,897,582   7/1975   Olcott .

FOREIGN PATENT DOCUMENTS

| 300756 | 1/1989 | (EP) . |
|---|---|---|
| 495700 | 7/1992 | (EP) . |
| 2544661 | 10/1984 | (FR) . |

*Primary Examiner*—Edward J. Cain
(74) *Attorney, Agent, or Firm*—Weingarten, Schurgin, Gagnebin & Hayes LLP

(57) ABSTRACT

A friction element is made out of a composite material comprising carbon fiber reinforcement and a matrix which, at least in the vicinity of the or each friction face, comprises: a first phase in the vicinity of the reinforcing fibers and containing pyrolytic carbon obtained by chemical vapor infiltration; a refractory second phase of carbon or ceramic obtained at least in part by pyrolysis of a liquid precursor; and a silicon carbide phase obtained by siliciding, for example. At least in the vicinity of the or each friction face, the composite material is preferably constituted, by volume, at least as follows: 15% to 35% carbon fibers; 10% to 55% first matrix phase containing pyrolytic carbon; 2% to 30% second matrix phase of refractory material; and 10% to 35% silicon carbide. The invention is applicable in particular to braking for rail or road vehicles.

34 Claims, 3 Drawing Sheets

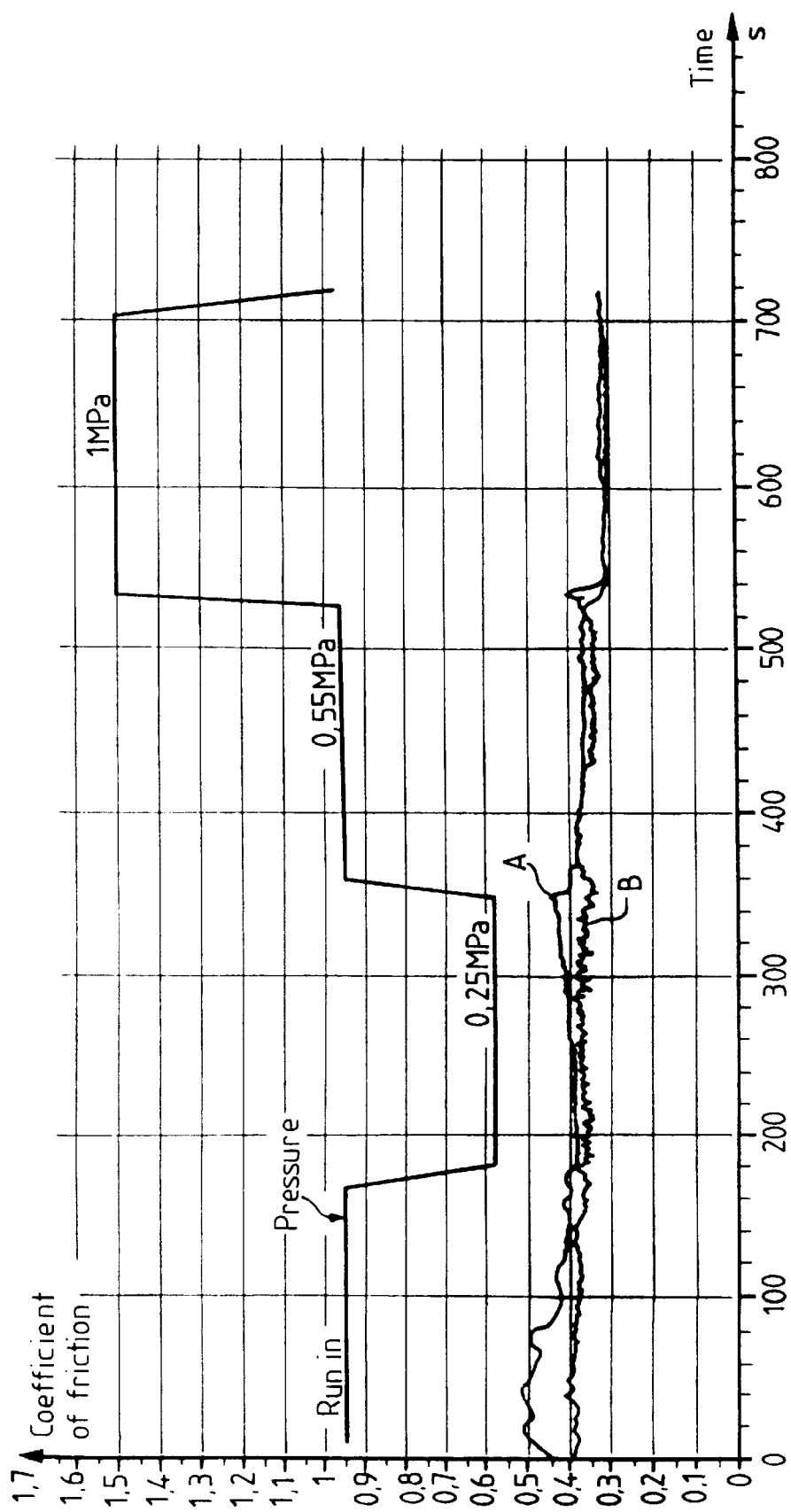

Figure 1:
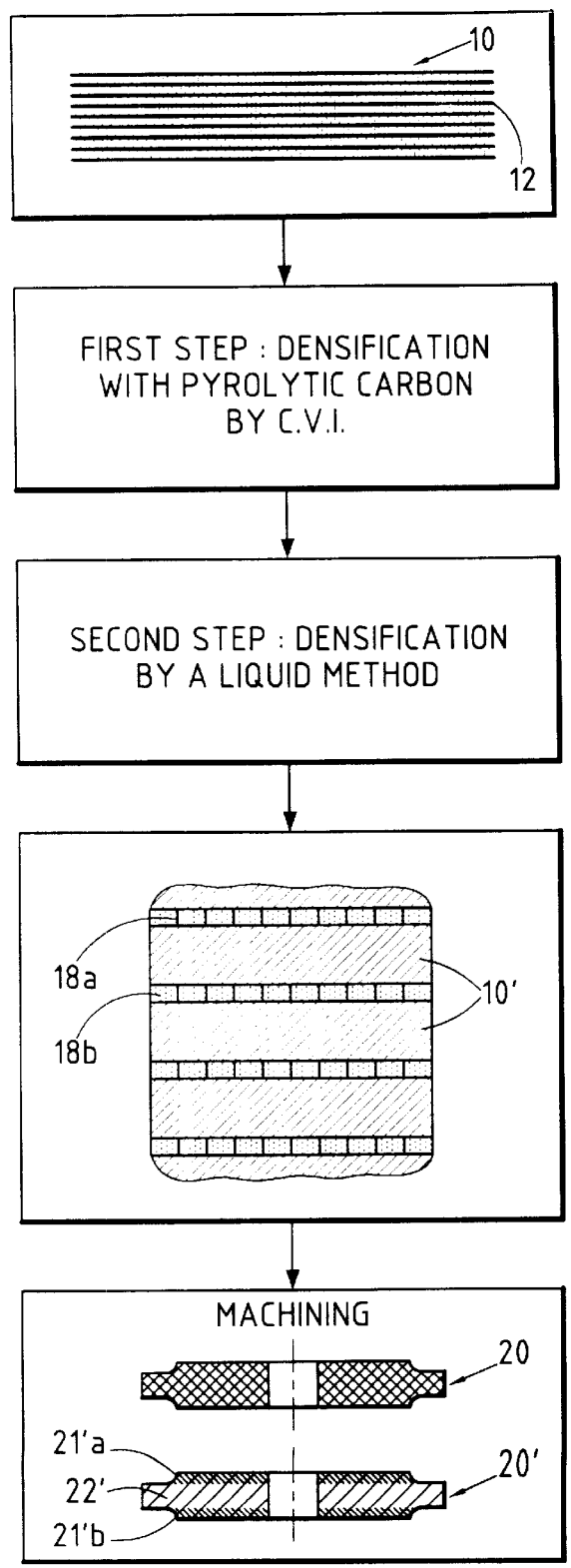

FRICTION ELEMENT IN COMPOSITE CARBON/CARBON-SILICON CARBIDE MATERIAL AND METHOD FOR MANUFACTURING SAME

The present invention relates to C/C—SiC composite materials, i.e. materials having carbon fiber reinforcement densified by a combined carbon and silicon carbide matrix, for use in friction elements such as brake disks and/or brake pads.

It is well known to use friction elements made of C/C composite material manufactured by preparing a fiber preform made of carbon fibers and densifying the preform with a carbon matrix.

Preforms are prepared from a base of felts or fiber fabrics such as woven cloth, braids, knits, unidirectional sheets of threads, strands, or cables, or laminates made up of a plurality of unidirectional sheets superposed in different directions and bonded together by light needling. To prepare a preform, a plurality of layers made of base fabric plies and/or felt are superposed and bonded together until the desired thickness has been reached. Bonding can be made by needling performed individually on each layer, for example as described in document U.S. Pat. No. 4,790,052. The base fabrics or felts used are made of carbon fibers or of carbon precursor fibers with the precursor, when present, being transformed by heat treatment after the preform has been prepared.

Densification with the carbon matrix is performed by chemical vapor infiltration or by using a liquid process.

Chemical vapor infiltration consists in placing the preform in an enclosure and in admitting a gas into the enclosure which gas diffuses throughout the preform under predetermined conditions of temperature and pressure and forms a deposit of pyrolytic carbon on the fibers. As a general rule the gas comprises one or more hydrocarbons, e.g. methane, giving pyrolytic carbon by decomposition.

The liquid process of carbon densification consists in impregnating the preform with a carbon precursor in the liquid state, e.g. a resin having a non-zero coke content, and in transforming the precursor into carbon by heat treatment.

In the field of braking, C/C composites are in use at present for aircraft brake disks, but their use for land vehicles is presently restricted to F1 racing cars.

For those uses, C/C composites are generally obtained by densifying a preform with a pyrolytic carbon matrix made by chemical vapor infiltration. Unfortunately, that method is lengthy and expensive, and leads to cost prices that are generally incompatible with requirements for uses in other fields, such as rail vehicles or mass-produced private vehicles. In addition, in such other uses, the demands made of the friction elements are very different from those encountered on aircraft or F1 racing cars. Although these demands are generally less severe, tests performed by the Applicant have shown several problems. Thus, it appears that braking effectiveness varies, in particular as a function of braking intensity, and is relatively low under conditions of wet braking. In addition, wear is significant and leads to insufficient lifetime.

In order to solve those problems, at least in part, and in particular to increase resistance to wear, document EP-A-0 300 756 proposes making C/C composite friction elements that are obtained by densifying a preform by chemical vapor infiltration and by performing a final siliciding operation by impregnating the preform with molten silicon which reacts with the carbon of the matrix to form silicon carbide (SiC).

Nevertheless, chemical vapor infiltration processes as generally performed today remain relatively lengthy and expensive.

An object of the present invention is to provide C/C—SiC composite friction elements of cost and performance that makes them suitable for use in brakes for rail vehicles or for mass-produced private vehicles or for racing vehicles, or indeed for utility or industrial vehicles such as heavy trucks.

In particular, an object of the invention is to provide friction elements which provide braking effectiveness that is regular and reproducible regardless of whether braking conditions are intense or otherwise, and regardless of whether the environment is dry or wet.

Another object of the present invention is to provide friction elements which wear little and which are suitable for being used for rubbing against materials of various kinds.

These objects are achieved by a friction element having at least one friction face and made of a composite material comprising carbon fiber reinforcement and a matrix having at least a carbon phase and a silicon carbide phase, in which friction element, at least in the vicinity of the or each friction face, the matrix comprises: a first phase containing pyrolytic carbon obtained by chemical vapor infiltration in the vicinity of the reinforcing fibers; a second phase that is refractory and obtained at least in part from a liquid precursor by pyrolysis; and a phase of silicon carbide.

Such a friction element can constitute a brake disk or at least a brake disk friction lining, in a disk brake for a rail vehicle or for a mass-produced private motor vehicle, or for a racing vehicle, or for a utility or industrial vehicle.

The term "pyrolytic carbon phase" is used herein to mean a phase of pyrolytic carbon obtained by chemical vapor infiltration using one or more gaseous precursors of carbon.

The term "refractory phase" is used herein to mean a phase of carbon or of ceramic.

Advantageously, at least in the vicinity of the or each friction face, the composite material is constituted, by volume, by:

15% to 35% carbon fibers;
10% to 55% of first matrix phase containing pyrolytic carbon obtained by chemical vapor infiltration;
2% to 30% of second matrix phase of refractory material coming at least in part from a liquid precursor; and
10% to 30% silicon carbide.

The matrix phase obtained by chemical vapor infiltration forms a continuous coating of pyrolytic carbon of constant thickness on the fibers which coating is, at least initially, not cracked. By covering the fibers completely, the pyrolytic carbon can protect them during the formation of the silicon carbide phase of the matrix. In addition, pyrolytic carbon, when obtained by chemical vapor infiltration, has rather high thermal conductivity so it provides the composite material with thermomechanical properties that are sufficient at least to perform the heat sink function for evacuating the heat generated by friction. In addition to pyrolytic carbon, the first matrix phase may include one or more layers of a material capable of protecting the pyrolytic carbon, and the underlying carbon fibers, from oxidizing. A material for providing protection against oxidizing and suitable for deposition by chemical vapor infiltration is silicon carbide, a ternary Si—B—C system, or boron carbide. The material can be selected from precursors of a self-healing glass, i.e. precursors that are suitable on oxidizing for forming a glass which, on passing to a semisolid state at the temperature at which the friction element is used, plugs any cracks that appear in the first phase of the matrix.

Various types of method can be used for performing the chemical vapor infiltration, in particular constant temperature and pressure methods, temperature gradient methods, pressure gradient methods, or vaporized film methods. Temperature gradient methods can be implemented by inductive coupling between an induction coil and a core situated beside the preform that is to be densified, or by direct coupling between an induction coil and the preform. Constant temperature methods with a pressure gradient can be performed by constraining the gas constituting a precursor for the matrix to follow a path either by means of a flow that is directed under constant pressure conditions, as described in co-pending U.S. patent application Ser. No. 08/945,325 corresponding to PCT/FR96/00582, or else with a forced flow as described in international patent application WO 96/15288. Vaporized film methods consist in immersing the preform in a bath and in heating the preform to a temperature so that a film of precursor vapor forms on contact with the preform, with infiltration then taking place in the vapor phase, e.g. as described in U.S. Pat. No. 4,472,454.

The carbon or ceramic second phase of the matrix can be formed by a resin coke, or by pitch, or by a ceramic residue obtained by pyrolyzing a ceramic precursor. Carbon precursor resins in the liquid state are selected, e.g. from thermosetting resins such as phenolic, furanic, or epoxy resins, thermoplastic resins, pitch, or combinations thereof. Ceramic precursors in the liquid state are, for example, polysilazane or polycarbosilane resins or combinations thereof. A matrix phase obtained by a liquid process, such as a resin coke, has relatively low thermal conductivity. That makes it possible from the beginning of braking to reach, on the friction face, a local temperature that is relatively high.

When C/C—SiC composites are used in friction, they present a coefficient of friction that is relatively low when they are cold, and it becomes higher when they are hot. A rapid transition to a high coefficient of friction thus makes it possible to obtain good braking effectiveness even at very low speeds and when braking under wet conditions. Furthermore, the refractory phase obtained by the liquid process constitutes only a fraction of the matrix, which fraction is not in contact with the fibers, and it does not penalize the heat sink function in unacceptable manner. Also, the second matrix phase is present in the form of a mass of carbon or ceramic housed within the pores that remain after the first matrix phase has been formed. This increases the possibility of closing the pores with the silicon carbide of the last phase of the matrix. Closing the pores in this way makes it possible to avoid a wet environment having an influence on tribological properties.

It is possible to form the second matrix phase in part by means of a solid filler, e.g. a carbon powder or a ceramic powder, or a powder of a material for providing protection against oxidizing. The solid filler can be injected in the form of a suspension in the liquid precursor.

The silicon carbide phase of the matrix is effective in reducing wear. In particular, it confers increased hardness to the composite material, making it possible to associate it in friction with a wide range of different materials. In addition, the presence of SiC makes it possible to obtain efficiency under dry conditions from the lowest of braking energies. Also, SiC provides increased resistance to oxidizing, by forming a barrier against ambient oxygen in the core of the composite material, and by closing the pores, at least to a large extent.

According to a feature of the friction element of the invention, the matrix has a silicon carbide phase which need be present only over a limited depth starting from the or each friction face.

Thus, when the friction element is a brake disk having a core and at least one friction portion, or wear portion, with a friction face, the core of the disk can be made at least in part out of composite material in which the matrix does not have a silicon carbide phase. Also, the absence of a silicon carbide phase confers lower stiffness to the core and preserves good mechanical behavior for the core of the disk when taking up braking forces which are generally transmitted by mechanical connections via the inner or outer periphery of the core.

It is also possible to make a friction element of the invention in the form of a friction or wear lining which is secured to a disk core of metal. The friction lining can have silicon carbide phase throughout its thickness or over a limited depth starting from the friction face.

In another aspect, an object of the invention is to provide a method of manufacturing a friction element of C/C—SiC composite material, the method being of the type comprising preparing a carbon fiber preform having internal pores that are accessible and densifying the preform with a matrix having at least a carbon phase and at least a silicon carbide phase.

According to the invention, densification of the preform comprises: a first step of chemical vapor infiltration to fill 10% to 55% of the volume of the preform by a first matrix phase containing pyrolytic carbon and forming a continuous coating on the carbon fibers; a second step of densification by impregnating the partially-densified preform with a composition containing a precursor for refractory material in the liquid state, and transforming the precursor by heat treatment; and a third step of forming a matrix phase of silicon carbide, at least in the vicinity of the or each friction face.

According to a feature of the invention, during the first densification step, a first matrix phase containing pyrolytic carbon and at least one layer of material for protection against oxidizing can be formed by chemical vapor infiltration.

According to another feature of the method, the second densification step is performed by impregnating the partially-densified preform with a composition containing a precursor in the liquid state comprising at least one of the compounds selected from resins and pitch giving a carbon residue by pyrolysis and resins giving a ceramic residue by pyrolysis. The composition can also contain a solid filler in suspension such as carbon powder, ceramic powder, or powder of a material for providing protection against oxidizing.

According to yet another feature of the method, high temperature heat treatment is performed after the second densification step and prior to forming the silicon carbide phase of the matrix. This heat treatment, performed at a temperature lying in the range about 1800° C. to about 2850° C., makes it possible to improve the thermal properties of the final material, in particular its thermal conductivity, and this applies in particular when the second phase of the matrix is made of carbon.

The silicon carbide phase of the matrix can be made in various ways:

siliciding by introducing silicon in the molten state and reacting it with the carbon of at least one of the first two phases of the matrix;

siliciding by infiltrating a gas carrying silicon or silicon vapor at high temperature, typically in excess of 1800° C.;

siliciding by introducing a solid filler in the form of silicon powder and applying heat treatment to cause the silicon to react with the carbon of the matrix;

chemical vapor infiltration; or introducing a solid filler in the form of an SiC powder in suspension in a liquid that is caused to infiltrate into the partially-densified preform.

Siliciding is advantageously performed simultaneously on a plurality of densified preforms by placing a plurality of densified preforms in alternation with sources of silicon, each source comprising a majority phase that is based on silicon and a minority phase that is suitable for forming a structure for retaining and draining molten silicon, and by heating to a temperature higher than the melting temperature of silicon so that molten silicon can migrate from each source to within the or each adjacent densified preform.

Such a siliciding method is described in co-pending U.S. patent application Ser. No. 09/068,700 corresponding to PCT/FR96/01598.

That method has the advantage of enabling the degree of siliciding to be controlled. To this end, the quantity of silicon included in a preform densified through the or each friction face is determined as a function of a desired depth for siliciding, so as to form a matrix phase of silicon carbide over a limited depth starting from the or each friction face.

Figure 2A:
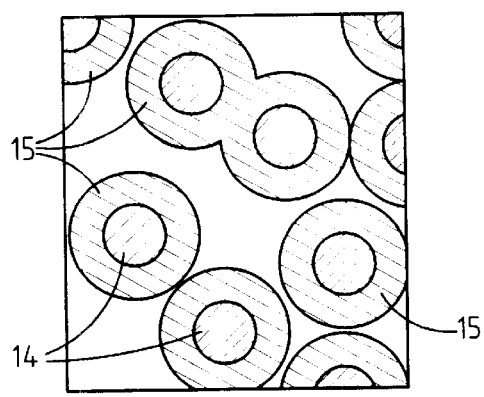
Figure 2B:
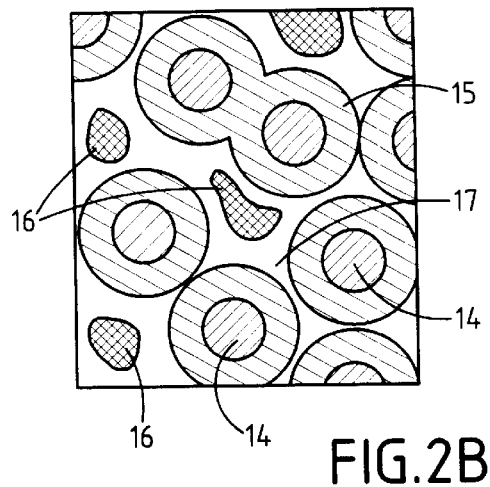
Figure 2C:
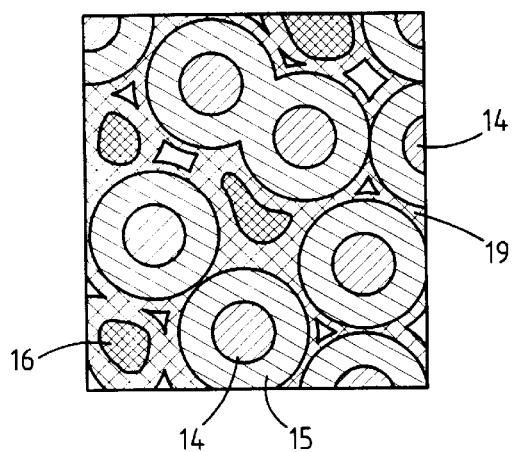
Figure 3:
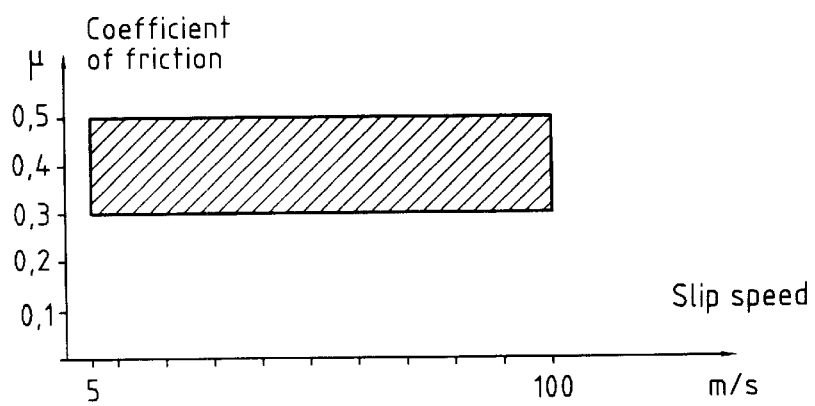

Embodiments of the invention are described below in detailed manner by way of non-limiting indication. Reference is made to the accompanying drawings, in which:

FIG. 1 shows the successive steps of a method of the invention;

FIGS. 2A, 2B, and 2C are highly diagrammatic views of the microstructure of the composite material at different steps in the manufacture of a friction element; and FIGS. 3 and 4 are graphs showing how the coefficient of friction varies over time during tests on a friction element of the invention at different rates of slip, different braking pressures, and in environments that are dry or wet.

In the description below, reference is made more particularly to manufacturing a friction element in the form of a brake disk of C/C—SiC composite material, it being understood that other types of friction element can be made in the same material, such as brake pads and friction linings fixed on one or both faces of disk cores having one or two friction faces.

Manufacture of a brake disk comprises (FIG. 1):
preparing an annular fiber preform 10 made of carbon fibers;
a first step of partially densifying the preform with a matrix phase that is formed at least in part out of pyrolytic carbon obtained by chemical vapor infiltration;
a second step of partially densifying the preform by means of a carbon or ceramic matrix phase obtained at least in part by a liquid process;
a step of forming a matrix phase out of silicon carbide; and
a final stage of machining the disk to its final dimensions.

The fiber preform 10 is prepared by superposing layers or plies of a fiber fabric 12 or of a plurality of different fabrics, and bonding the plies together by needling. The fiber fabric 12 can be constituted by a felt, a weave, a knit, a unidirectional sheet of threads, cables, or strands, or a laminate made up of a plurality of unidirectional sheets superposed in different directions and bonded together by light needling. The various layers or plies are stacked and needled one by one as described in particular in document U.S. Pat. No. 4,790,052, each needling pass being implemented with density of needle strokes per unit area and with a depth of needle penetration that are substantially constant so as to obtain a substantially uniform density of needling per unit volume. Layers or plies are stacked and needled until a preform of the desired thickness has been obtained.

The fiber fabric 12 is made of carbon fibers or of carbon-precursor fibers, e.g. fibers of pre-oxidized polyacrylonitrile.

In which case, the carbon precursor is transformed by heat treatment performed on the fiber fabric before or after the preform has been prepared.

An annular preform can be obtained by stacking and needling plane plies and then cutting out a piece from the preform at the end of the needling process. It is also possible to use precut annular plies. Both methods are well known, so there is no need to describe them in detail herein.

The volume fraction of the carbon fibers in the preform is preferably, on average, in the range about 15% to about 35%. It is a function of the covering ratio of the fiber fabric used and of the intensity of the needling which produces an effect whereby the fiber fabric is compressed. The term "volume fraction" of the fibers is used herein to mean the fraction of the apparent volume of the preform that is indeed occupied by the fibers. It will be observed that the volume fraction of the fibers can be smaller in the vicinity of the friction faces than in the portion of the preform corresponding to the core of the disk, e.g. in the friction faces it can drop down to 10%. Too small a fiber volume fraction in the core of the disk penalizes the reinforcing function of the fibers and thus the mechanical properties of the core of the resulting composite disk, whereas too high a volume fraction of fibers gives rise to a loss of porosity that impedes densification. The preform thus has internal porosity lying in the range 65% to 85% of the volume, and particularly because of the way the preform is prepared, its porosity is open, i.e. accessible from the outside.

Before the first densification step, a solid filler can be introduced into the preform to occupy about 2% to 10% of the volume of the preform. Such a solid filler is in the form of a refractory powder, i.e. carbon powder or ceramic powder.

The first densification step is performed by placing the preform in a chamber of a chemical vapor infiltration installation and it is performed by means of a constant temperature and pressure process. A reaction gas is introduced into the chamber in which temperature and pressure conditions for facilitating diffusion of the gas within the pores of the preform are established, and matrix material is deposited on the fibers by the gas reacting when it comes into contact with the surface of the fibers. Pyrolytic carbon is typically deposited from a gas comprising one or more hydrocarbons, e.g. methane. The temperature inside the enclosure is typically maintained at a value lying in the range 950° C. to 1150° C., and the pressure in the range 1 kPa to 3 kPa.

It is preferable to place a plurality of annular preforms in the chamber of the chemical vapor infiltration installation so that they can be treated simultaneously. An example of how a plurality of preforms can be loaded as a stack, with the flow of gas being directed, is described in above-mentioned French patent application No. 2 733 254.

As already mentioned, other chemical vapor infiltration processes could be used, e.g. a temperature gradient process, such as heating the preform by direct inductive coupling, or a pressure gradient process, or a vaporized film process.

Chemical vapor infiltration leads to a continuous pyrolytic carbon coating 15 being formed that covers the fibers 14 individually (FIG. 2A). This first step of densifying the preform is preferably continued until about 10% to 55% of the volume of the preform has been filled with pyrolytic carbon. The quantity of pyrolytic carbon deposited on the fibers must be sufficient to give the disk the required ability to conduct heat so as to be capable of providing a heat sink function while also providing adequate mechanical strength. Nevertheless, the quantity of pyrolytic carbon that is deposited must remain limited so as to leave sufficient porosity for the purpose of continuing densification.

The first densification step can also include forming one or more layers of material for providing protection against oxidizing, either covering the pyrolytic carbon or interleaved with layers of pyrolytic carbon. The material that provides protection against oxidizing and that is deposited by chemical vapor infiltration can be silicon carbide, boron carbide, or a ternary Si—B—C compound. Advantageously, a material is used that is suitable, in an oxidizing atmosphere, for forming a self-healing glass at the temperature at which the brake disk is used.

The second densification step is performed by a liquid process by impregnating the partially-densified preform with a precursor of carbon or of ceramic in the liquid state and then transforming the precursor by heat treatment. The carbon precursor is typically a resin having a non-zero coke content (coke content being the amount of carbon-containing residue that is obtained after carbonization, expressed as a percentage relative to the initial mass of the resin), or indeed it can be pitch. Suitable resins include in particular thermosetting resins such as phenolic resins, furanic resins, and epoxy resins, thermoplastic resins, pitch, and combinations thereof. A ceramic precursor is typically a resin such as a polysilazane or a polycarbosilane resin or a combination thereof.

Impregnation is performed, for example, by immersing the preform in a bath of impregnation compound formed by the resin optionally together with a solvent. Impregnation can be performed under pressure or under a vacuum in order to facilitate penetration of the impregnation compound into the core of the remaining porosity of the preform. The impregnated preform is dried and then after the resin has cross-linked, it is subjected to pyrolytic treatment by being raised to a temperature of about 900° C. to 1000° C.

The second densification step is performed in one or more successive impregnation-carbonization cycles, so as to fill about 4% to 40% of the volume of the preform with the refractory matrix phase. The quantity of carbon or of ceramic obtained by the liquid process must be sufficient for the final composite material to have a refractory matrix phase of low thermal conductivity that encourages a rapid transition towards a high coefficient of friction. Nevertheless, sufficient residual accessible internal porosity must remain to enable the silicon carbide matrix phase to be formed.

In the example shown, the refractory material obtained by the liquid process is carbon. It is in the form of a mass 16 of resin coke or of pitch coke received in the pores 17 of the partial densified preform (FIG. 2B).

During the second densification step, solid filler can be included in suspension in the liquid precursor. The solid filler is constituted, for example, by carbon powder, ceramic powder, or a powder of a material for providing protection against oxidizing, such as a precursor for a self-healing glass.

Heat treatment at a temperature lying in the range about 1800° C. to 2850° C. can be performed immediately after the second matrix phase has been formed, particularly when the phase is made of carbon, thereby improving the thermal conductivity of the material.

The silicon carbide phase of the matrix can be obtained by siliciding the preform, i.e. by introducing molten silicon or silicon in vapor form into the remaining accessible porosity and reacting the silicon with the pyrolytic carbon of the first phase of the matrix and with the carbon of the second phase of the matrix. Various known siliciding techniques can be used, for example immersion in a bath of molten silicon or connecting the densified preform to a bath of molten silicon via a drain that brings the silicon to the preform by capillarity.

Advantageously, a stack siliciding method is used of the type described in above-cited French patent application No. 95 13458. A plurality of densified preforms 10' are superposed with sources of silicon 18 being interposed between them, the sources being disposed between the preforms 10' and also at the ends of the stack. The sources of silicon 18 are constituted for the most part by a phase of silicon or a phase based on silicon, e.g. in the form of a powder, and they have a minority phase suitable for forming a structure for retaining and draining molten silicon. The minority phase is, for example, a rigid cellular structure such as a honeycomb structure 18a in which the cells are filled with powdered silicon 18b. In a variant, the minority phase may be constituted by a three-dimensional lattice of low porosity such as a felt made of short fibers, or a non-rigid cellular fabric such as a foam, with the minority phase extending throughout the volume of the silicon source.

The siliciding treatment is performed by taking the stack of preforms 10' and silicon sources 18 to a temperature lying, for example, in the range 1410° C. to 1600° C., at low pressure, e.g. at less than 50 kPa, and under an inert atmosphere, e.g. under argon or a vacuum. When the silicon contained in the sources 18 reaches its melting point, it migrates towards the adjacent preforms via their surfaces in contact with the sources 18. Starting from the source 18, this migration takes place under gravity towards a preform 10' situated beneath it, and by capillarity towards a preform 10' situated above it.

On infiltrating into the remaining pores in the densified preforms 10', the molten silicon forms silicon carbide (SiC) 19 by reacting with the carbon, both the pyrolytic carbon 15 and the carbon 16 obtained by the liquid process (FIG. 2C). An SiC layer is thus formed right to the core of the densified preform, since its porosity has not been closed. This layer, depending on the porosity remaining in the densified preform prior to siliciding, can have a thickness of a few microns to more than 10 microns, providing the source has sufficient silicon. As a result, the resulting disk has internal protection against oxidizing imparted thereto by the SiC 19 which forms a barrier against oxygen from the surrounding medium. In addition, in the vicinity of the friction faces of the disk, SiC gives the disk hardness and the ability to withstand wear. It will also be observed that by reacting with the pyrolytic carbon which covers the surface of the pores 17 and also with the carbon of the grains 16 which occupy the same pores in part, the silicon produces SiC 19 that leads to the pores being closed at least in part, thus sealing the composite material. This reduces the influence of a wet environment.

The resulting disk 20 is machined to its final dimensions, in particular by rectifying its friction face(s) and forming at its outer periphery or at its inner periphery a series of notches (not shown) serving to connect the disk 20 to the member with which it is fast in rotation.

It will be observed that the disk can be machined prior to performing siliciding. The faces of the silicon sources 18 used under such circumstances are then of shapes that are complementary to those of the faces of the disks.

The siliciding treatment is performed so as to cause 10% to 35% of the volume of the densified preform to be occupied by silicon carbide. The residual porosity of the densified preform is preferably reduced to a value of less than 10% of the volume after siliciding.

The resulting disk 20 then comprises, by volume:

15% to 35% carbon fibers;

5% to 45% pyrolytic carbon formed by chemical vapor infiltration and not transformed into SiC;

2% to 30% carbon obtained by the liquid process and not transformed into SiC; and 10% to 35% SiC.

Such a material has very low density, lying in the range 1600 to 2100 kg/m$^3$, a coefficient of thermal expansion that is less than $2 \times 10^{-6}$ per degree K, and thermal diffusivity greater than that of steels. In addition, as can be seen from the examples below, its friction levels are stable and reproducible without sudden discontinuity and without any significant influence from environmental constraints.

Although the description above envisages siliciding the densified preform right through the core thereof, it can be advantageous to limit the depth of siliciding from each friction face. This limitation is obtained by using sources that contain a quantity of silicon that is insufficient for total siliciding. The silicon deficit is determined as a function of the desired depth of siliciding. It is thus possible to obtain disks such as 20' (FIG. 1) in which the friction portions or wear portions 21'a and 21'b are silicided, while the core of the disk 22' does not contain any SiC, at least in the central portion thereof. Thus, the SiC provides the desired qualities of hardness and of resistance to wear, and also reduces the residual porosity in the wear portions, while the absence of SiC, in at least a large portion of the core enhances both the heat sink effect and mechanical strength. Lower rigidity in the core provides better transmission of forces between the disks and the fixed or rotating part to which it is connected, generally by notches formed around the inner periphery or the outer periphery of the core.

In the above, the silicon carbon phase of the matrix is described as being formed by siliciding by introducing silicon in the molten state. Nevertheless, other methods of preparing such a matrix phase can be envisaged, such a siliciding by silicon introduced in gaseous form, siliciding by silicon introduced in the form of a powder followed by heat treatment, chemical vapor infiltration, and introducing a solid filler of SiC.

Chemical vapor infiltration of SiC is a process that is well known, with the gaseous precursor generally being methyltrichlorosilane (MTS). The process can be implemented under constant temperature and pressure conditions or with a temperature gradient or with a pressure gradient. During the temperature gradient process, the densified preform can be heated by direct coupling between the preform and an induction coil.

Filler can be introduced under a vacuum by impregnating a suspension of SiC powder in a liquid. It can be finished off in a final step of chemical vapor infiltration.

When using chemical vapor infiltration and filler introduction, there is no reaction with the pyrolytic carbon or with the carbon optionally constituting the refractory phase, so the final composite material has the same quantities of carbon as originally deposited during the first and second densification steps.

EXAMPLE 1

Disks and pads for rail vehicle disk brakes have been made as follows.

The fiber preforms were prepared by needling superposed layers of carbon fiber felt and the preforms were cut out so as to obtain annular disk preforms having a thickness of 60 mm, an inside diameter of 235 mm, and an outside diameter of 660 mm, and so as to obtain rectangular block preforms for pads having dimensions of 15 mm×8 mm×40 mm. The volume fraction of fibers in the preforms was 25%.

A first step of densifying the preforms by chemical vapor infiltration was performed using a gaseous phase constituted by a mixture of natural gas and propane, the temperature was maintained at about 1000° C. and the pressure at about 1.3 kPa. Chemical vapor infiltration was continued until about 42% of the volume of the preforms had been filled with pyrolytic carbon.

The partially-densified preforms were impregnated with a furanic resin and then subjected to heat treatment so as to form a second matrix phase of resin coke. Impregnation was performed under a vacuum by immersion in a bath of resin. After drying and curing the resin, the resin was carbonized at a temperature of 900° C. Resin impregnation was performed in such a manner as to obtain resin coke occupying 17% of preform volume.

The preforms densified in this way with carbon had accessible residual porosity of about 16% of the volume.

After the densified preforms were machined, siliciding was performed by the stack siliciding method described in above-mentioned French patent application No. 95 13458.

The quantity of molten silicon introduced into the densified preforms was selected so as to obtain an SiC matrix phase representing about 20% of the volume of the silicided composite material, which corresponds to depositing SiC to a thickness of more than 10 microns.

The friction elements (disks and pads) obtained in that way had a density of about 1950 kg/m$^3$, and a final porosity of about 10%, with their content by volume being as follows:

about 25% carbon fibers;

about 37% pyrolytic carbon obtained by chemical vapor infiltration;

about 8% carbon constituted by resin coke; and about 20% SiC.

A brake constituted by a disk and pads made in this way was tested on a dry braking bench with slip speeds variable over the range 5 meters per second (m/s) to 100 m/s. The friction coefficient was measured at various slip speeds and at different times during the test. In FIG. 3, the shaded zone shows the range in which all of the measured values were to be found. Braking efficiency was therefore substantially unchanged over a wide range of slip speeds.

A similar brake was tested in dry braking at a constant imposed slip speed of 20 m/s. After running in for 3 minutes (min) while a braking pressure of 0.55 MPa was being applied, the coefficient of friction was measured while applying three different braking pressures respectively equal to 0.25 MPa, to 0.55 MPa, and to 1 MPa each during a period of 3 min. Curve A in FIG. 4 shows how the measured braking coefficient varied as a function of time.

A similar brake was tested under the same conditions except that its environment was wet, with the brake being continuously hosed with water. Curve B in FIG. 4 shows how the measured braking coefficient varied as a function of time.

Curves A and B show the excellent behavior of silicided C—C composite friction elements made in accordance with the invention. Firstly the coefficient of friction is remarkably stable for various braking pressures, and secondly the measured values were practically identical under dry conditions and under wet conditions. Constant braking effectiveness is thus achieved under different conditions of use.

EXAMPLE 2

Disks for the disk brakes of an up market mass-produced private vehicle were made as follows.

The fiber preforms were prepared by needling superposed layers of carbon fiber felt and the preforms were cut out to obtain annular disk preforms having a thickness of 35 mm, an inside diameter of 160 mm, and an outside diameter of 360 mm. The volume fraction of the fibers in the preforms was 22%.

A first chemical vapor infiltration step was performed alternating the deposition of layers of pyrolytic carbon and the deposition of thin layers (about 0.5 micron thick) of boron carbide $B_4C$, until 40% of the initial volume of the preforms had been filled.

The partially-densified preforms were impregnated with a phenolic resin and then subjected to heat treatment at 900° C. so as to form a second matrix phase out of resin coke. Impregnation was performed so as to fill about 18% of the volume of the preforms with resin coke, such that the residual porosity of the preforms was about 10% of the volume.

After machining, siliciding was performed as in Example 1, however it was performed over a limited thickness from each friction face, using sources of silicon that deliberately contained a quantity of silicon that was insufficient to achieve siliciding right through the core. The resulting disks had varying composition:

over the first 10 millimeters from each friction face, the composition by volume was 22% carbon fibers, 25% pyrolytic carbon +$B_4C$, 5% resin coke, and about 33% SiC, with the residual porosity then being about 7%;

in the remainder of the disk, in particular in the central portion of its core, the composition by volume was 22% fiber fraction, 40% pyrolytic carbon +$B_4C$, 18% resin coke, and about 0% silicon carbide, with the residual porosity being 10%.

The resulting disks had smaller apparent density, of the order of 1700 kg/m$^3$, and reduced rigidity, however in the wear portions they had tribological properties comparable to those of the disks of Example 1.

EXAMPLE 3

Brake disks for motor vehicles were made as follows.

The fiber preforms were prepared by needling superposed layers of carbon fiber felt and the preforms were cut out so as to obtain annular disk preforms having a thickness of 32 mm, an inside diameter of 180 mm, and an outside diameter of 320 mm. The volume fraction of the fibers in the preforms was 30%.

A first step of chemical vapor infiltration was performed to form a pyrolytic carbon matrix phase occupying 30% of the volume of the preform.

The partially-densified preforms were impregnated with polycarbosilane resin and then subjected to heat treatment so as to form a second matrix phase of SiC constituted by a pyrolysis residue and occupying 12% of the volume of the preform.

The preforms densified in that way were machined and a matrix phase of silicon carbide was introduced by chemical vapor infiltration under constant temperature and pressure conditions until 20% of the volume of the preforms was occupied by SiC.

The residual porosity of the resulting disks was 8% of the volume.

The resulting disks had lower apparent density, but their tribological properties were comparable to those of the disks of Example 1, in their wear portions.

EXAMPLE 4

Brake disks were made as follows.

Fiber preforms were prepared by needing superposed layers of carbon fiber felt and cutting out preforms so as to obtain annular preforms in which the fiber volume ratio was 23%.

A first step of chemical vapor infiltration was performed to form a matrix phase of pyrolytic carbon occupying 45% of the volume of the preform.

The partially-densified preforms were impregnated with a phenolic resin and then subjected to heat treatment at 900° C. so as to form a second matrix phase of resin coke occupying 10% of the volume of the preform.

The preforms densified in this way were subjected to heat treatment at 2800° C. in order to improve the thermal conductivity of the carbon phases of the matrix.

Thereafter, a third step of chemical vapor infiltration was performed to form a matrix phase of silicon carbon (SiC) occupying 15% of the volume of the preform.

The resulting disks had excellent tribological properties.

What is claimed is:

1. A friction element having at least one friction face and made of a composite material comprising carbon fiber reinforcement and a matrix having at least a carbon phase and a silicon carbide phase, the element being characterized in that, at least in the vicinity of each friction face, the matrix comprises: a first phase containing pyrolytic carbon obtained by chemical vapor infiltration in the vicinity of the reinforcing fibers; a second phase that is refractory and obtained at least in part from a liquid precursor by pyrolysis; and a phase of silicon carbide.

2. A friction element according to claim 1, characterized in that at least in the vicinity of each friction face, the composite material is constituted, by volume, by at least:

15% to 35% carbon fibers;

10% to 55% of first matrix phase containing pyrolytic carbon obtained by chemical vapor infiltration;

2% to 30% of second matrix phase of refractory material coming at least in part from a liquid precursor; and 10% to 30% silicon carbide.

3. A friction element according to claim 1, characterized in that the first matrix phase includes at least one layer of material for protection against oxidizing.

4. A friction element according to claim 1, characterized in that the second refractory phase is made of carbon.

5. A friction element according to claim 1, characterized in that the second refractory phase is made of ceramic.

6. A friction element according to claim 1, characterized in that the matrix has a silicon carbide phase over a limited depth from the or each friction face.

7. A brake disk having a core and at least one wear portion having a friction face, the disk being characterized in that it includes a friction element in accordance with claim 1.

8. A brake disk according to claim 7, characterized in that the core of the disk is constituted at least in part of composite material in which the matrix does not have a silicon carbide phase.

9. A disk brake for a rail vehicle, characterized in that it includes at least one disk according to claim 7.

10. A disk brake for a private, racing, utility, or industrial vehicle, characterized in that it includes a disk according to claim 7.

11. A method of manufacturing a composite material friction element having at least one friction face, the method comprising preparing a carbon fiber preform having accessible internal pores, and densifying the preform with a matrix having at least a carbon phase and at least a silicon carbide phase, the method being characterized in that densification of the preform comprises: a first step of chemical vapor infiltration to fill 10% to 55% of the volume of the preform by a first matrix phase containing pyrolytic carbon and forming a continuous coating on the carbon fibers; a second step of densification by impregnating the partially-densified preform with a composition containing a precursor for refractory material in the liquid state, and transforming the precursor by heat treatment; and a third step of forming a matrix phase of silicon carbide, at least in the vicinity of each friction face.

12. A method according to claim 11, characterized in that a preform is prepared having an average fiber volume fraction lying in the range 15% to 35%.

13. A method according to claim 11, characterized in that solid refractory filler is incorporated in the preform prior to the first densification step.

14. A method according to an claim 11, characterized in that during the first densification step, a first matrix phase containing pyrolytic carbon and at least one layer of material for protection against oxidizing is formed by chemical vapor infiltration.

15. A method according to claim 11, characterized in that the second densification step is performed so as to fill 4% to 40% of the volume of the preform with a refractory material obtained by a liquid process.

16. A method according to claim 11, characterized in that the second densification step is performed by impregnating the partially-densified preform with a composition containing a precursor in the liquid state comprising at least one of the compounds selected from resins and pitch giving a carbon residue by pyrolysis, and resins giving a ceramic residue by pyrolysis.

17. A method according to claim 16, characterized in that the impregnation composition further comprises solid fillers in suspension selected from powders of carbon, of ceramic, and of material for providing protection against oxidizing.

18. A method according to claim 11, characterized in that, after the second densification step and before the third step, heat treatment is performed at a temperature lying in the range 1800° C. to 2850° C.

19. A method according to claim 11, characterized in that the third step is performed in such a manner as to occupy 5% to 35% of the volume of the preform with silicon carbide, at least in the vicinity of each friction face.

20. A method according to claim 11, characterized in that the third step is performed in such a manner as to reduce the residual internal porosity of the densified preform to a value of less than 10% of the volume at least in the vicinity of each friction face.

21. A method according to claim 11, characterized in that the third step of forming a matrix phase of silicon carbide is performed by siliciding by introducing silicon in the molten state and causing it to react with the carbon of at least one of the first two phases of the matrix.

22. A method according to claim 21, characterized in that the siliciding is performed simultaneously in a plurality of densified preforms by placing a plurality of densified preforms in alternation with sources of silicon each comprising a majority phase based on silicon and a minority phase suitable for forming a structure for retaining and draining molten silicon, and by heating to a temperature higher than the melting temperature of silicon so that molten silicon can migrate from each source into the or each adjacent densified preform.

23. A method according to claim 22, characterized in that silicon sources are used in which the silicon-based majority phase is in powder form.

24. A method according to claim 22, characterized in that silicon sources are used in which the minority phase is a three-dimensional structure extending throughout the volume of the silicon source.

25. A method according to claim 24, characterized in that the three-dimensional structure if selected from rigid cellular structures, arrays of fibers, and non-rigid cellular materials.

26. A method according to claim 21, characterized in that the quantity of silicon introduced into a densified preform via the or each friction face is determined as a function of a desired depth of siliciding so as to form a silicon carbide matrix phase over a depth that is limited from each friction face.

27. A method according to claim 11, characterized in that the third step of forming a silicon carbide matrix phase is performed by chemical vapor infiltration.

28. A method according to claim 11, characterized in that the third step of forming a silicon carbide matrix phase is performed by siliciding by infiltrating a silicon carrier gas at high temperature.

29. A method according to claim 11, characterized in that the third step of forming a silicon carbide matrix phase is performed by siliciding by introducing silicon powder and by performing heat treatment.

30. A method according to claim 11, characterized in that the third step of forming a silicon carbide matrix phase is performed at least in part by introducing a solid filler in the form of silicon carbide powder in suspension in a liquid.

31. A friction element according to claim 2, characterized in that:
the first matrix phase includes at least one layer of material for protection against oxidizing;
the second refractory phase is made of one of carbon and ceramic; and
the matrix has a silicon carbide phase over a limited depth from each friction face.

32. A brake disk having a core and at least one wear portion having a friction face, the disk being characterized in that it includes a friction element in accordance with claim 6 and characterized in that:
the core of the disk is constituted at least in part of composite material in which the matrix does not have a silicon carbide phase; and further characterized in that the brake disk includes one of at least one disk for a rail vehicle and a disk for a private, racing, utitlity, or industrial vehicle.

33. A method according to claim 12, characterized in that:
solid refractory filler is incorporated in the preform prior to the first densification step;
during the first densification step, a first matrix phase containing pyrolytic carbon and at least one layer of material for protection against oxidizing is formed by chemical vapor infiltration;
the second densification step is performed so as to fill 4% to 40% of the volume of the preform with a refractory material obtained by a liquid process;
the second densification step is performed by impregnating the partially-densified preform with a composition containing a precursor in the liquid state comprising at least one of the compounds selected from resins and pitch giving a carbon residue by pyrolysis, and resins giving a ceramic residue by pyrolysis;

the impregnation composition further comprises solid fillers in suspension selected from powders of carbon, of ceramic, and of material for providing protection against oxidizing;

after the second densification step and before the third step, heat treatment is performed at a temperature lying in the range 1800° C. to 2850° C.;

the third step is performed in such a manner as to occupy 5% to 35% of the volume of the preform with silicon carbide, at least in the vicinity of the or each friction face;

the third step is performed in such a manner as to reduce the residual internal porosity of the densified preform to a value of less than 10% of the volume at least in the vicinity of each friction face;

the third step of forming a matrix phase of silicon carbide is performed by siliciding by introducing silicon in the molten state and causing it to react with the carbon of at least one of the first two phases of the matrix;

the siliciding is performed simultaneously in a plurality of densified preforms by placing a plurality of densified preforms in alternation with sources of silicon each comprising a majority phase based on silicon and a minority phase suitable for forming a structure for retaining and draining molten silicon, and by heating to a temperature higher than the melting temperature of silicon so that molten silicon can migrate from each source into the or each adjacent densified preform;

silicon sources are used in which the silicon-based majority phase is in powder form;

silicon sources are used in which the minority phase is a three-dimensional structure extending throughout the volume of the silicon source;

the three-dimensional structure if selected from rigid cellular structures, arrays of fibers, and non-rigid cellular materials; and the quantity of silicon introduced into a densified preform via the or each friction face is determined as a function of a desired depth of siliciding so as to form a silicon carbide matrix phase over a depth that is limited from the or each friction face.

34. A method according to claim 20, characterized in that the third step of forming a silicon carbide matrix phase is performed by one of chemical vapor infiltration, siliciding by infiltrating a silicon carrier gas at high temperature, siliciding by introducing silicon powder and by performing heat treatment, and at least in part by introducing a solid filler in the form of silicon carbide powder in suspension in a liquid.

* * * * *